United States Patent Office 3,097,236
Patented July 9, 1963

3,097,236
PREPARATION OF FLUOROSULFUR
COMPOUNDS
David M. Marquis, Salt Lake City, Utah, assignor to E. I. du Pont de Nemours and Company, Wilmington, Del., a corporation of Delaware
No Drawing. Filed Apr. 29, 1959, Ser. No. 809,605
5 Claims. (Cl. 260—543)

This invention relates to polymerizable fluorine-containing thiocarbonyl compounds and has as its main object provision of a new process for making the same, thiocarbonyl fluoride in particular.

Thiocarbonyl fluoride, $F_2C=S$, has recently been converted to polymers (see U.S. Patent 2,980,695) especially useful because of their particular property of chemical inertness. For example, the polymer is insoluble in, and unaffected by, boiling concentrated nitric acid, 10% aqueous sodium hydroxide, sulfuric acid at 150° C., and organic solvents such as acetone, alcohol, dioxane, and dimethyl sulfoxide. The polymer can be shaped at elevated temperatures and pressures and films can be obtained, e.g., from chloroform solutions of the polymer. Thiocarbonyl fluoride, when obtained in a state of relatively high purity, is readily converted to polymer. A method heretofore proposed to provide thiocarbonyl fluoride involves the fluorination of tetrachloro-1,3-dithietane followed by pyrolysis of the tetrafluoro-1,3-dithietane.

The present invention provides an improved process for the preparation of polymerizable fluorine-containing thiocarbonyl compounds, especially thiocarbonyl fluoride, by the continuous vapor phase reaction of sulfur with a perhalogenated olefin containing two fluorines on carbon doubly bonded to a further carbon at a temperature of at least 475° C.

As noted, the process of this invention involves a vapor phase reaction and is continuous, i.e., the fluoroolefin and sulfur are continuously introduced and products removed from the heated zone after a short contact time at the elevated temperature. The temperature is preferably between about 500° C. and 700° C. for the reaction although temperatures of the order of 850° C. and higher can be used. Lower temperatures, e.g., 475° C., are also useful; however, the yield of thiocarbonyl compound is reduced at temperatures below 475° C.

The time the reactants are maintained in the reaction vessel depends on the temperature employed. When higher temperatures are used, the time involved (as measured by rate of flow through the reaction vessel) is generally less than when lower temperatures are used. In general, the contact time is between about one and ten seconds per pass.

In one mode of practicing the invention, sulfur is introduced directly into a heated (475° C. or above) reaction vessel in any convenient manner. Preferably the sulfur is added as a liquid since the rate of addition is easy to measure in this manner. However, sulfur can also be added as a gas or as a solid. At the temperatures employed, sulfur is in vapor form as soon as it enters the reaction vessel. In another mode of practicing the invention, the gaseous fluoroolefin is passed through liquid sulfur, which has an appreciable vapor pressure, and thence into a reaction zone heated at 475° C. or above.

The reaction vessel may contain packing to provide rapid heat transfer to the reactants being introduced. The packing includes materials which are stable at the temperatures used and nonreactive with sulfur or fluorine-containing thiocarbonyl compounds, e.g., platinum gauze, and metal fluorides such as sodium, calcium, or aluminum fluoride.

Sulfur may be introduced into the reaction zone in an amount and a rate in excess of that at which it reacts with the polyfluoroolefin. Excess sulfur is readily recovered by cooling the exit vapors. Similarly any fluoroolefin that does not react is readily separated from the thiocarbonyl fluoride. Nonreacted starting materials can be recycled in the reaction. A ratio of sulfur to fluoroolefin of at least 1:1, generally 1:1 to 3:1, on a molar basis is very satisfactory.

Inert gaseous diluents such as nitrogen can be present although they are not essential. Such gases should preferably not be used in extremely large amounts since they reduce the relative concentration of reactants in any reaction zone of relatively small size. These diluents can also be passed through liquid sulfur, where vapors thereof are collected, and thence into contact with the organic reactant at 475° C. or above. In the process of this invention the pressure employed is substantially atmospheric although pressures of slightly greater or less than atmospheric can be employed.

The fluoroolefins employed in the process are completely halogenated, i.e., perhalogenated, and have a carbon bearing two fluorines and a double bond to a further carbon (i.e., a $=CF_2$ unit). The perhaloolefin compounds that can be used can have chlorine present in addition to fluorine and include those of the formula $F_2C=CX_2$ where the X's are fluorine or chlorine, e.g., 1,1-dichloro-2,2-difluoroethylene, trifluorochloroethylene and tetrafluoroethylene, as well as olefins of three or more carbons, e.g., hexafluoropropene. Particularly preferred are perfluoroolefins of 2–3 carbons. The compounds can be represented by the formula $F_2C=C(X)R_x$ where $R_x$ is chlorine, fluorine or perfluoroalkyl, e.g., $CF_3$. When the olefinic compound has over two carbons, a perhalothioketone may be formed along with thiocarbonyl fluoride. The latter is formed in major amounts when the reaction temperature is high, e.g., above 750° C. When the reaction temperature is lower, relatively higher concentrations of polymerizable trifluorothioacetyl fluoride are formed. The latter compounds (perfluorothioketone and perfluorothioacyl fluoride) are polymerizable and copolymerizable and have utility as polymers similar to that of thiocarbonyl fluoride.

The following examples further illustrate the practice of this invention.

EXAMPLE I

A ¾" platinum tube containing platinum gauze packing was set vertically. It had a heated zone 11" long and was equipped with a dropping funnel (heated by means of a vapor bath of chlorobenzene) and a gas inlet tube. The exit end was attached through a trap to a receiver which was cooled with a solid carbon dioxide/acetone mixture. The tube was heated to 490–504° C. as measured by a thermocouple attached to the outside of the platinum tube. In a period of 40 minutes there was introduced into the hot tube a total of 10 g. of tetrafluoroethylene at a rate of 1 ml. per second and 9 ml. of sulfur (measured as liquid). There was obtained in the cooled receiver 5 g. of product from which there was obtained by distillation 3 g. of thiocarbonyl fluoride and 0.5 g. fraction containing trifluorothioacetyl fluoride.

EXAMPLE II

The general procedure of Example I was repeated with the following exceptions: The tube was heated to 600–625° C. for 90 minutes. A total of 40 ml. of sulfur added and a total of 8620 ml. of tetrafluoroethylene at a rate 0.4 ml./sec. for 30 minutes, 1 ml./sec. for 30 minutes and 3.4 ml./sec. for 30 minutes. From the condensate distillation gave 33 g. of thiocarbonyl fluoride boiling at −53° to −49° C. and 2.5 g. boiling between −49° and −29°

C. The latter contained predominantly trifluorothioacetyl fluoride. The structure of the products was ascertained by n-m-r.

The thiocarbonyl fluoride as obtained by distillation from the reaction products was readily polymerizable on standing preferably in the presence of an initiator such as dimethylformamide.

EXAMPLE III

*Reaction of Hexafluoropropylene and Sulfur*

A metered stream of hexafluoropropylene gas was passed through a heated pot of molten sulfur and from there upward through a vertically mounted ½" platinum lined inconel reactor tube. The tube was heated over a 15" zone with electrical furnaces (2) and was connected on the top to a splash head type steel trap. From this trap the gas stream was led to a trap cooled in solid carbon dioxide/acetone mixture for collection.

The amount of sulfur vapor entering the reactor was regulated by controlling the temperature of the sulfur pot (and hence the vapor pressure of the sulfur above the liquid sulfur). The sulfur pot was maintained at 375° to 395° during the reaction. The temperature of the reactor tube was measured by thermocouples on the outside of the tube and was maintained at 800° to 850° during the reaction.

Approximately 109 g. of hexafluoropropylene was fed at a rate of 215 cc./min. for 83 minutes; 83.5 g. of liquid was collected in the solid carbon dioxide trap. Composition of a sample of the product gases taken toward the end of the reaction time as determined by mass spectrographic analysis is given below:

| | |
|---|---|
| $SiF_4$ | 0.1 |
| Perfluoroisobutylene | 19.3 |
| $CF_3$—$CF_2$—$CF_3$ | 4.0 |
| $CF_3C\equiv CCF_3$ | 0.8 |
| Hexafluoropropylene | 46.0 |
| $C_2F_6$ | 10.3 |
| $CF_2S$ | 15.8 |
| $CS_2$ | 0.5 |
| COS | 1.1 |

EXAMPLE IV

*Reaction of Tetrafluoroethylene and Sulfur*

The general procedure of Example III was repeated with the following exceptions: The sulfur pot was held between 390° and 407°, and the reactor tube between 612° and 690°. About 37.9 g. of tetrafluoroethylene was fed at a rate of 370 cc./min. for 25 minutes; 46.5 g. of liquid product was collected in a trap cooled with a solid carbon dioxide/acetone mixture.

The fluorocarbon composition of the product as determined by mass spectrographic analysis is shown below:

| | |
|---|---|
| Perfluoroisobutylene | 1.1 |
| $CF_3$—$CF_2$—$CF_3$ | 0.2 |
| Hexafluoropropylene | 3.2 |
| Octafluorocyclobutane | 0.6 |
| $CF_2S$ | 91.8 |
| $SiF_4$ | 1.0 |
| $CS_2$ | 0.3 |
| COS | 1.1 |
| $C_2F_6$ | 0.5 |

Since obvious modifications of and equivalents in the invention will be evident to those skilled in the chemical arts, I propose to be bound solely by the appended claims.

The embodiments of the invention in which an exclusive property or privilege is claimed are defined as follows:

1. The process which comprises reacting, in the vapor phase and at a temperature between 475° C. and the decomposition temperature of the reactants, the reactant system consisting essentially of sulfur and a compound of the formula $F_2C=C(X)R_x$, where $R_x$ is a member of the group consisting of chlorine, fluorine and perfluoroloweralkyl and X is a member of the group consisting of chlorine and fluorine.

2. The process of claim 1 in which the reaction temperature is about 500–700° C.

3. The process which comprises reacting, in the vapor phase and at a temperature between 475° C. and the decomposition temperature of the reactants, the reactant system consisting essentially of sulfur and tetrafluoroethylene and continuously withdrawing at least one member of the group consisting of thiocarbonyl fluoride and trifluorothioacetyl fluoride from the reaction mixture.

4. The process of producing thiocarbonyl fluoride which comprises reacting, in the vapor phase and at a temperature of about 500–700° C., the reactant system consisting essentially of sulfur and tetrafluoroethylene.

5. The process which comprises reacting, in the vapor phase and at a temperature between 500° C. and the decomposition temperature of the reactants, the reactant system consisting essentially of sulfur and hexafluoropropylene and thereby producing thiocarbonyl fluoride.

References Cited in the file of this patent

UNITED STATES PATENTS

| | | |
|---|---|---|
| 2,712,554 | Miller | July 5, 1955 |
| 2,922,816 | Bruce | Jan. 26, 1960 |
| 2,962,529 | Marquis | Nov. 29, 1960 |

OTHER REFERENCES

Brandt et al., J.C.S. (London), p. 2201 (1952).
Lovelace, Aliphatic Fluorine Compounds, p. 222 (1958).